US012607345B1

(12) United States Patent
Baker et al.

(10) Patent No.: US 12,607,345 B1
(45) Date of Patent: Apr. 21, 2026

(54) ILLUMINATED SOFFIT VENT SYSTEM

(71) Applicants: Priscilla Baker, Harra, OK (US); Jeremy Baker, Harrah, OK (US)

(72) Inventors: Priscilla Baker, Harra, OK (US); Jeremy Baker, Harrah, OK (US)

( * ) Notice: Subject to any disclaimer, the term of this patent is extended or adjusted under 35 U.S.C. 154(b) by 0 days.

(21) Appl. No.: 19/189,464

(22) Filed: Apr. 25, 2025

(51) Int. Cl.
*F21V 33/00* (2006.01)
*F21S 9/03* (2006.01)
*F21Y 115/10* (2016.01)

(52) U.S. Cl.
CPC ............ *F21V 33/0088* (2013.01); *F21S 9/03* (2013.01); *F21Y 2115/10* (2016.08)

(58) Field of Classification Search
CPC ........ F21V 33/0088; F21V 5/007; F21V 5/02; F21S 9/03; F21S 8/02
USPC ............................ 362/253, 227, 234, 311.02
See application file for complete search history.

(56) References Cited

U.S. PATENT DOCUMENTS

| | | | | |
|---|---|---|---|---|
| 7,987,649 | B1 | 8/2011 | Polston | |
| 8,317,353 | B1 | 11/2012 | Martin | |
| 9,777,898 | B1 | 10/2017 | Landry et al. | |
| 9,921,368 | B2 | 3/2018 | Grigore | |
| 2005/0128751 | A1* | 6/2005 | Roberge | H05B 45/325 362/276 |
| 2005/0244225 | A1* | 11/2005 | Jordan | E01F 9/559 404/16 |
| 2006/0240762 | A1 | 10/2006 | Railkar et al. | |
| 2012/0047819 | A1 | 3/2012 | Shield et al. | |
| 2013/0107530 | A1* | 5/2013 | Wyrick | A01G 9/249 362/249.02 |
| 2015/0330040 | A1* | 11/2015 | Dobbs | F21V 15/01 362/183 |
| 2016/0178144 | A1 | 6/2016 | Haas | |
| 2018/0135840 | A1* | 5/2018 | Golle | F21V 23/003 |
| 2019/0376670 | A1 | 12/2019 | Ludwing et al. | |
| 2020/0095772 | A1 | 3/2020 | Lyons | |

* cited by examiner

*Primary Examiner* — Edwyn Labaze
(74) *Attorney, Agent, or Firm* — John D. Gugliotta

(57) ABSTRACT

A soffit vent cover is provided comprising a four-sided frame assembly having an inner side and an outer side, each defining an open middle. A screen is attached to the inner side, and a vent panel with apertures is attached to the outer side, both covering the open middle. A continuous perimeter channel is formed along the side surfaces of the frame assembly, sized to house a light string comprising a plurality of lamps. A solar power system provides power to the light string, including a photovoltaic panel, charge controller, rechargeable battery, and main controller. Additional components include a photocell for automatic activation during low-light conditions, a timer for scheduled operation, a mode switch for selecting lighting patterns, and a radio transmitter for remote control. The illuminating soffit vent cover combines ventilation functionality with aesthetic illumination, enhancing residential curb appeal while maintaining proper attic airflow without complex electrical infrastructure.

15 Claims, 3 Drawing Sheets

ILLUMINATED SOFFIT VENT SYSTEM

CROSS-REFERENCE TO RELATED APPLICATIONS

There are no previously filed, nor currently any applications, anywhere in the world.

BACKGROUND OF THE INVENTION

1. Field of the Invention

The present invention relates generally to building ventilation components with aesthetic illumination capabilities and, more particularly, to soffit vent covers incorporating solar-powered lighting systems for simultaneously providing attic ventilation and decorative perimeter illumination.

2. DESCRIPTION OF THE RELATED ART

Residential building structures commonly employ soffit ventilation systems to facilitate proper airflow to attic spaces and prevent moisture accumulation. Conventional soffit vent designs predominantly focus on functional aspects of ventilation while giving minimal consideration to aesthetic contributions to a building's exterior appearance.

Traditional soffit vents typically comprise simple perforated panels or screened openings installed along the underside of roof eaves. These conventional implementations, while functionally adequate for ventilation purposes, present a utilitarian appearance that fails to enhance the architectural aesthetics of residential structures.

Simultaneously, contemporary residential construction has witnessed increasing consumer demand for distinctive exterior aesthetic elements that differentiate properties within residential developments. Homeowners frequently seek methods to enhance curb appeal through architectural lighting solutions, which traditionally require separate installation, dedicated wiring infrastructure, and increased energy consumption.

Existing exterior lighting systems generally necessitate complex installation procedures involving dedicated electrical infrastructure, typically requiring professional installation services and significant modifications to existing building structures. Such systems commonly involve permanent wiring infrastructure connected to the building's primary electrical system, resulting in increased energy consumption and installation complexity.

Furthermore, current exterior lighting options are predominantly implemented as standalone systems that fail to integrate with essential building components, resulting in duplicative structures and inefficient utilization of architectural space. This lack of integration necessitates additional mounting hardware, protective enclosures, and maintenance considerations.

Solar-powered exterior lighting systems have emerged as alternatives to traditionally wired solutions, but these systems typically require prominent solar collection panels installed in aesthetically compromising locations to ensure adequate energy harvesting. Additionally, conventional solar lighting systems generally operate as independent units without integration with functional building components.

The need consequently exists for a multifunctional building component that simultaneously addresses ventilation requirements while enhancing architectural aesthetics through integrated illumination capabilities, preferably utilizing renewable energy sources, without compromising the primary ventilation functionality or requiring complex installation procedures.

SUMMARY OF THE INVENTION

It is thus an object of the present invention is to provide an illuminating soffit vent cover that integrates solar-powered LED lighting within a functional ventilation component, thereby enhancing residential curb appeal while maintaining proper attic airflow without requiring complex electrical infrastructure modifications.

It is a feature of the present invention to integrate a solar-powered LED lighting system within a functional soffit vent through a specialized perimeter channel design.

The present invention provides a system for illuminating soffit vent covers for building structures. In preferred embodiments, the inventive system includes: a soffit vent cover having inner and outer sides forming a rectangular frame assembly with an open middle; a screen attached to the inner side; a vent panel with apertures attached to the outer side; a continuous perimeter channel formed in the sides of the soffit vent cover; a light string comprising a plurality of lamps positioned within the perimeter channel; and a solar power system for providing electrical power to the light string. is thus an object of the present invention to provide an illuminating soffit vent cover that integrates solar-powered LED lighting within a functional ventilation component, thereby enhancing residential curb appeal while maintaining proper attic airflow without requiring complex electrical infrastructure modifications.

It is an advantage of the present invention that it combines both ventilation and illumination functions within a single architectural element, thereby eliminating the need for separate decorative lighting installations along soffit areas.

It is another advantage of the present invention that it utilizes solar power technology to operate lighting elements, thus eliminating the need for complex wiring infrastructure and reducing operational energy costs.

It is another advantage of the present invention that it provides enhanced curb appeal through perimeter illumination while maintaining all requisite ventilation parameters for proper attic airflow.

It is another advantage of the present invention that it incorporates automated operation through photocell activation, enabling lighting functionality precisely when environmental conditions warrant illumination.

It is another advantage of the present invention that it allows for programmable operation through timer and mode controls, providing customizable illumination patterns and duration settings.

It is another advantage of the present invention that it facilitates synchronized operation across multiple installation points through loop power connector technology.

It is another advantage of the present invention that it enables remote control capabilities through wireless communication protocols, permitting user adjustment without physical access to installation locations.

It is another advantage of the present invention that it incorporates pest prevention functionality through integrated screening while simultaneously providing decorative illumination.

It is another advantage of the present invention that it utilizes standardized sizing options compatible with conventional soffit installations, facilitating straightforward retrofitting in existing structures.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

Figure 1:
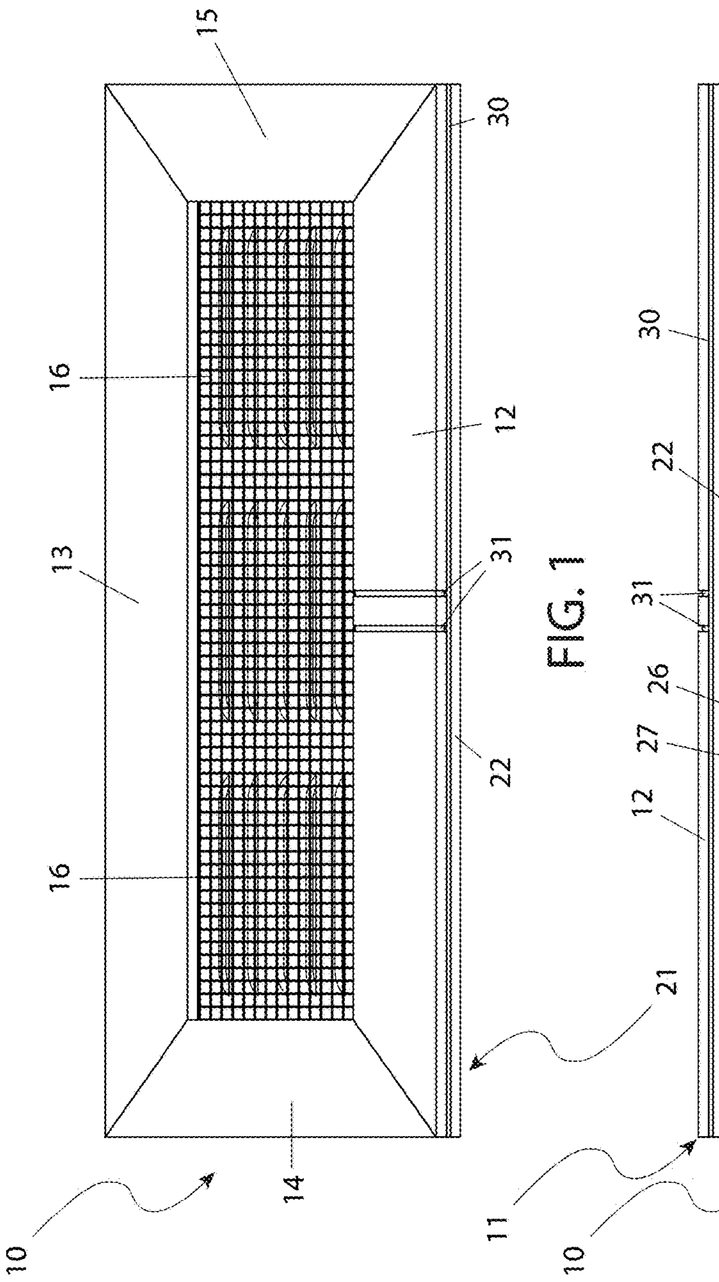
FIG. 1 is a perspective view of an inner side 11 of a soffit vent cover 10, in accordance with a preferred embodiment of the present invention.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, a soffit vent cover, generally noted as 10, is provided according to the preferred embodiment of the present invention. The soffit vent cover 10 capable of installation on a soffit portion of a building structure to provide ventilation from the interior thereof. The soffit vent cover 10 is particularly suited to provide ventilation and airflow for the attic or roof space. The soffit vent cover 10 also comprises integral illumination in the form of a plurality of lamps 55 strung together in a light string 50 on a perimeter thereof to provide various aesthetic effects as well as lighting for the immediate environment in low light level conditions. When installed on the building structure, the soffit vent cover 10 replaces a portion of an existing soffit vent cover and can be installed directly to the frame of the building structure. Alternately, the existing soffit panel can be cut and the soffit vent cover 10 can be fit thereinto. The soffit vent cover 10 is installed in such a manner as to enable the light string 50 to be exposed so that it is visible from the exterior of the building structure. The light string 50 is in electrical communication with photovoltaic panel 41 housed within an enclosure 40. The enclosure 40 is configured to be mounted directly to or adjacent to the building structure where the soffit vent cover 10 is installed.

Figure 2:
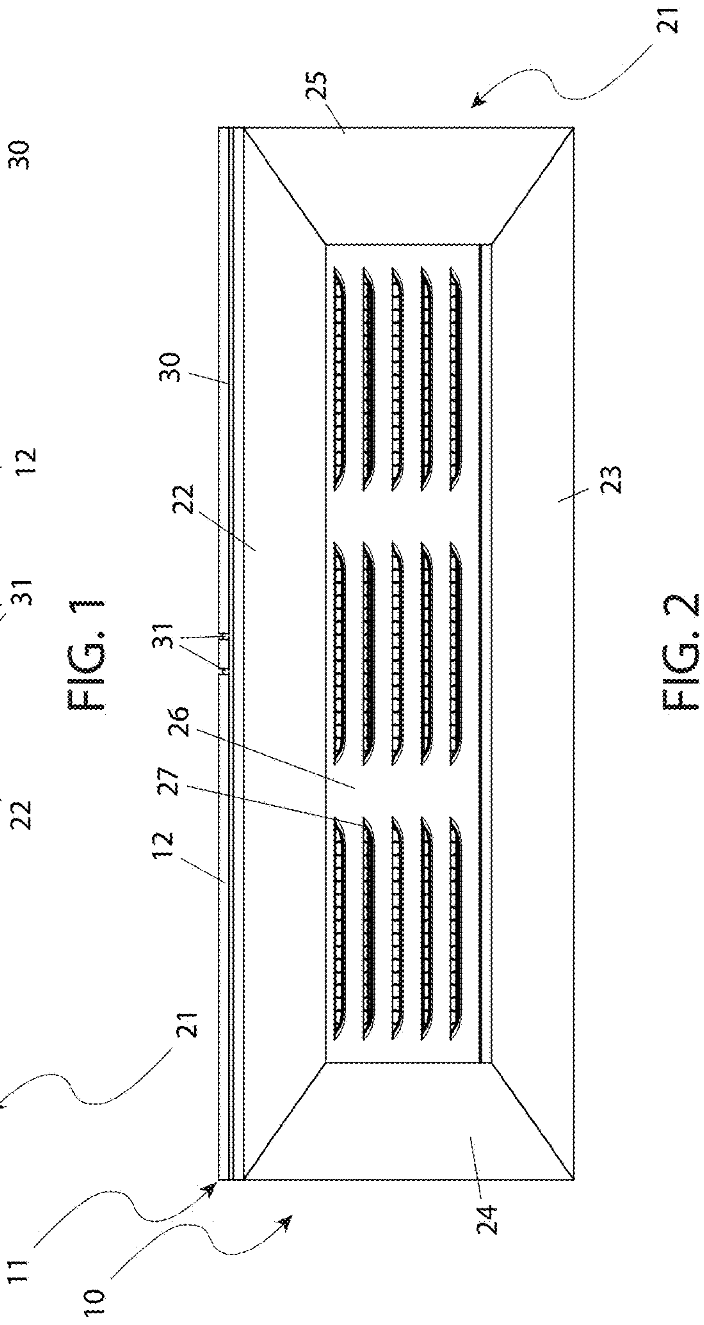
FIG. 2 is a perspective view of an outer side 21 of the soffit vent cover 10, in accordance with a preferred embodiment of the present invention.

Referring now to FIGS. 1 and 2, the soffit vent cover 10 has an inner side 11 and an outer side 21. When the soffit panel cover 10 is installed to the building structure, the inner side 11 faces inward and the outer side 21 is exposed. The inner side 11 essentially comprises a four-sided frame assembly having a front frame element inner side 12, a rear frame element inner side 13, a first side frame element inner side 14, and a second side frame element inner side 15. The frame element inner sides 12, 13, 14, 15 may be bevel cut on their opposing terminal ends. The terminal ends are joined together to provide a generally rectangular frame assembly inner side 11 with an open middle. The frame element inner sides 12, 13, 14, 15 may also have a sloped outer surface with a thicker outer perimeter relative to the inner perimeter. A screen 16 is attached to the inner sides of the frame element inner sides 12, 13, 14, 15 to cover the entire open middle.

The outer side 21 is essentially coextensive with the inner side 11. The outer side 21 also essentially comprises a four-sided frame assembly having a front frame element outer side 22, a rear frame element outer side 23, a first side frame element outer side 24, and a second side frame element outer side 25. The frame element outer sides 22, 23, 24, 25 may be bevel cut on their opposing terminal ends. The terminal ends are joined together to provide a generally rectangular frame assembly outer side 21 with an open middle. The open middle of the outer side 21 is aligned with the open middle of the inner side 11. The frame element outer sides 22, 23, 24, 25 may also have a sloped outer surface with a thicker outer perimeter relative to the inner perimeter. A vent panel 26 with a plurality of apertures 27 is attached to the inner sides of the frame element outer sides 22, 23, 24, 25 to cover the entire open middle. The vent panel 26, apertures 27, and screen 16 each function to prevent large particles from the environment to pass through the open middle of both the outer side 21 and inner side 16 to enter the roof or attic of the building structure while permitting air flow to and from the environment. The front, rear, first side, and second side frame elements are constructed so as to present the soffit vent cover 10 as a unitary piece.

Situated along the side surfaces of the soffit vent cover 10 midway between the inner side 11 and outer side 21 is a continuous perimeter channel 30 of approximately one-quarter of an inch ($\sqrt{1/4}$ in.) in depth and width. Situated in a midpoint of the rear frame element inner side, transversely oriented relative to the perimeter channel 30, are a pair of frame channels 31 of similar depth and width. The frame channels 31 extend from the perimeter channel 31 to the inner opening. The width and depth of the perimeter channel 30 and frame channels 31 are sized to permit a snug frictional fit of a light string 50 therein, while permitting the individual lamps 55 of the light string 50 to be at least partially exposed enough to permit adequate illumination.

The soffit vent cover 10 is configured to be available in multiple pre-set sizes. Examples of sizes can include six by eighteen inches (6×18 in.), eight by eighteen inches (8×18 in.), and ten by eighteen inches (10×18 in.). Other embodiments envision the soffit vent cover 10 be available as a customized color, material, and finish. The soffit vent cover 10 can be fabricated out of wood or plastic with a faux wood finish and the vent panel 26 and screen 16 can comprise a sheet steel or aluminum material that is weatherproof, durable, and inert.

Figure 3:
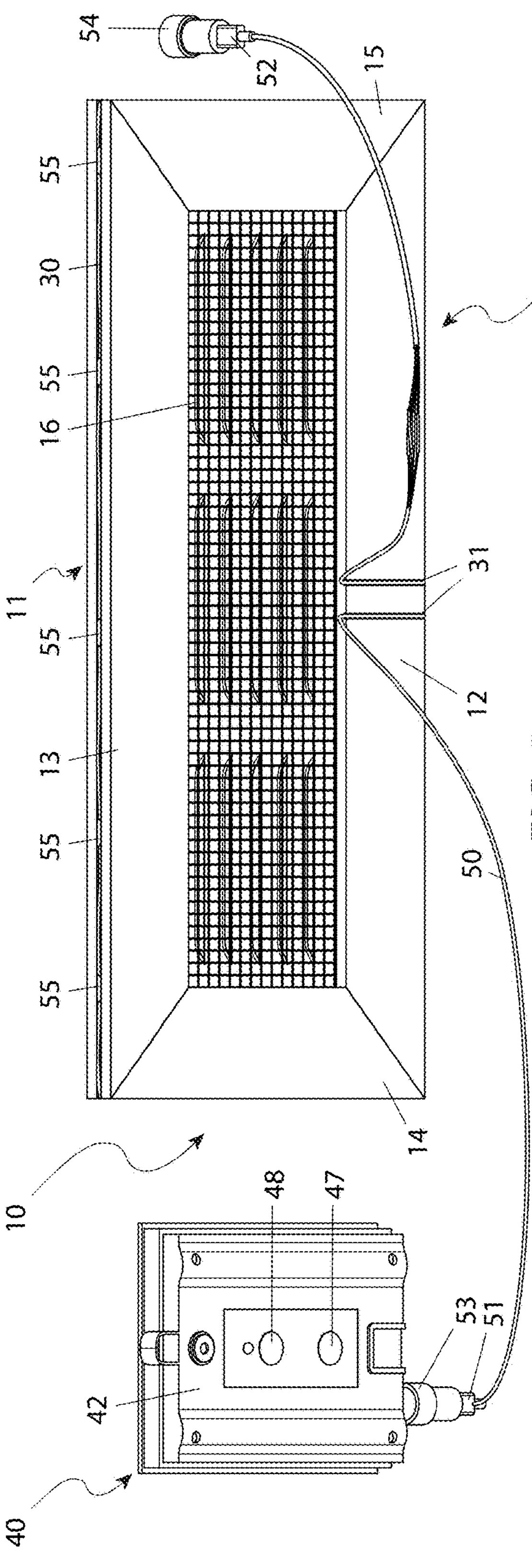
FIG. 3 is a perspective view of the inner side 11 of the soffit vent cover 10 with an enclosure 40 for a photovoltaic panel 41 installed thereto, illustrating a mount 42 and controls therefor, in accordance with the preferred embodiment of the present invention.
Figure 4:
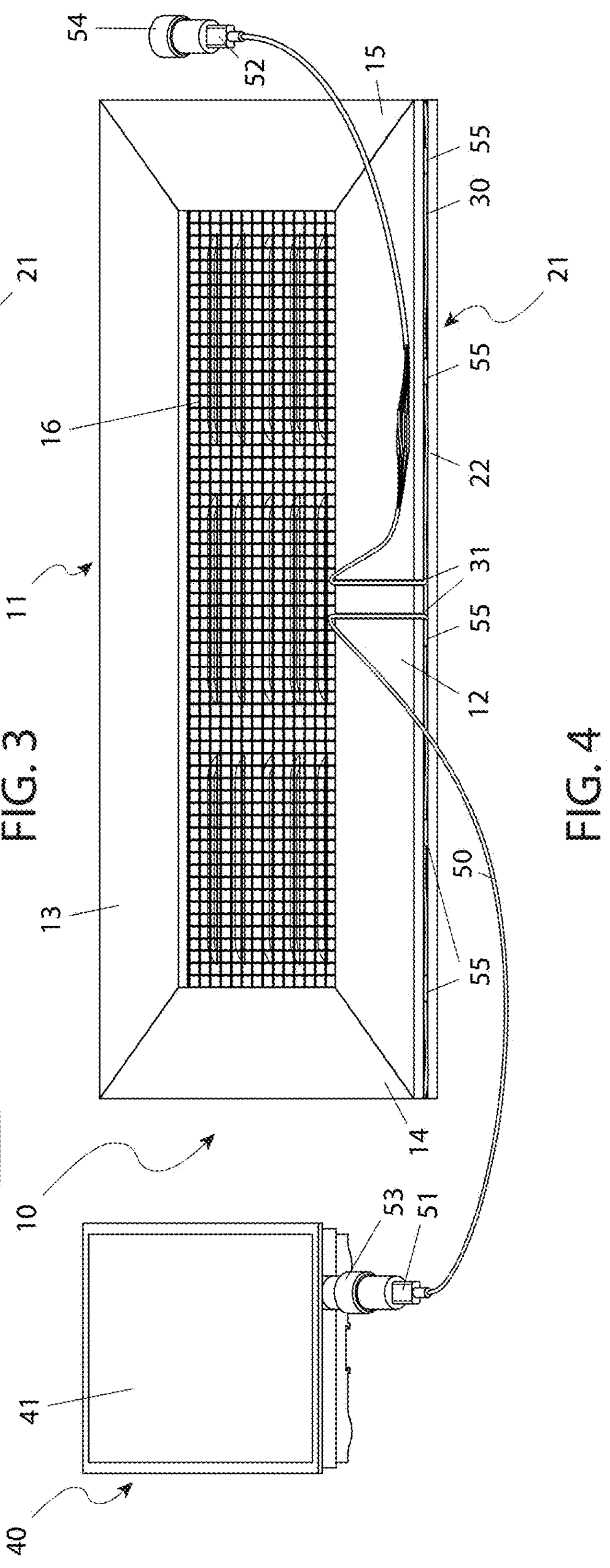
FIG. 4 is a perspective view of the inner side 11 of the soffit vent cover 10 with an enclosure 40 for a photovoltaic panel 41 installed thereto, in accordance with a preferred embodiment of the present invention; and, FIG. 5 is an electrical schematic of the illuminating soffit vent cover 10, in accordance with the preferred embodiment of the present invention.

Referring now to FIGS. 3 and 4, which illustrate the housing 40 for the photovoltaic panel 41 capable of providing controlled illumination to the light strings 50, and the routing of an individual light string 50 in the soffit vent cover 10 is herein described. The light string 50 may comprise lamps 55 that are light-emitting diodes (LED's) and configured to be available in multiple colors and intensities. The lamps 55 and photovoltaic panel 41 provide an economic and environmentally-friendly method to provide illumination. As can be seen, the light string 50 further comprises a first connector 51 at a first terminal end and a second connector 52 at a second terminal end. The first connector 52 is configured to be in electrical communication with the photovoltaic panel 41 via a first coupler 53. The second connector 52 is configured to be in electrical communication with another light string 50 via a second coupler 54.

The enclosure 40 depicts a first side, which frames the photovoltaic panel 41 and a second side, which comprises a mounting means 42 for the enclosure 40. It is appreciated that the mounting means 42 for the enclosure 40 is configured to removably attach to a support structure in such a manner so as to allow the photovoltaic panel 41 to be exposed and provide efficiency in collection of solar radiation in order to generate and provide power to however many light strings 50 are in electrical communication therewith. Also located on the second side is a timer 47 and mode switch 48, each in electrical communication between the photovoltaic panel 41 and any light string 50. The timer 47 and mode switch 48 in a preferred embodiment are located in such a way so as to allow access thereto regardless of the mounting means 42 being used.

Figure 5:
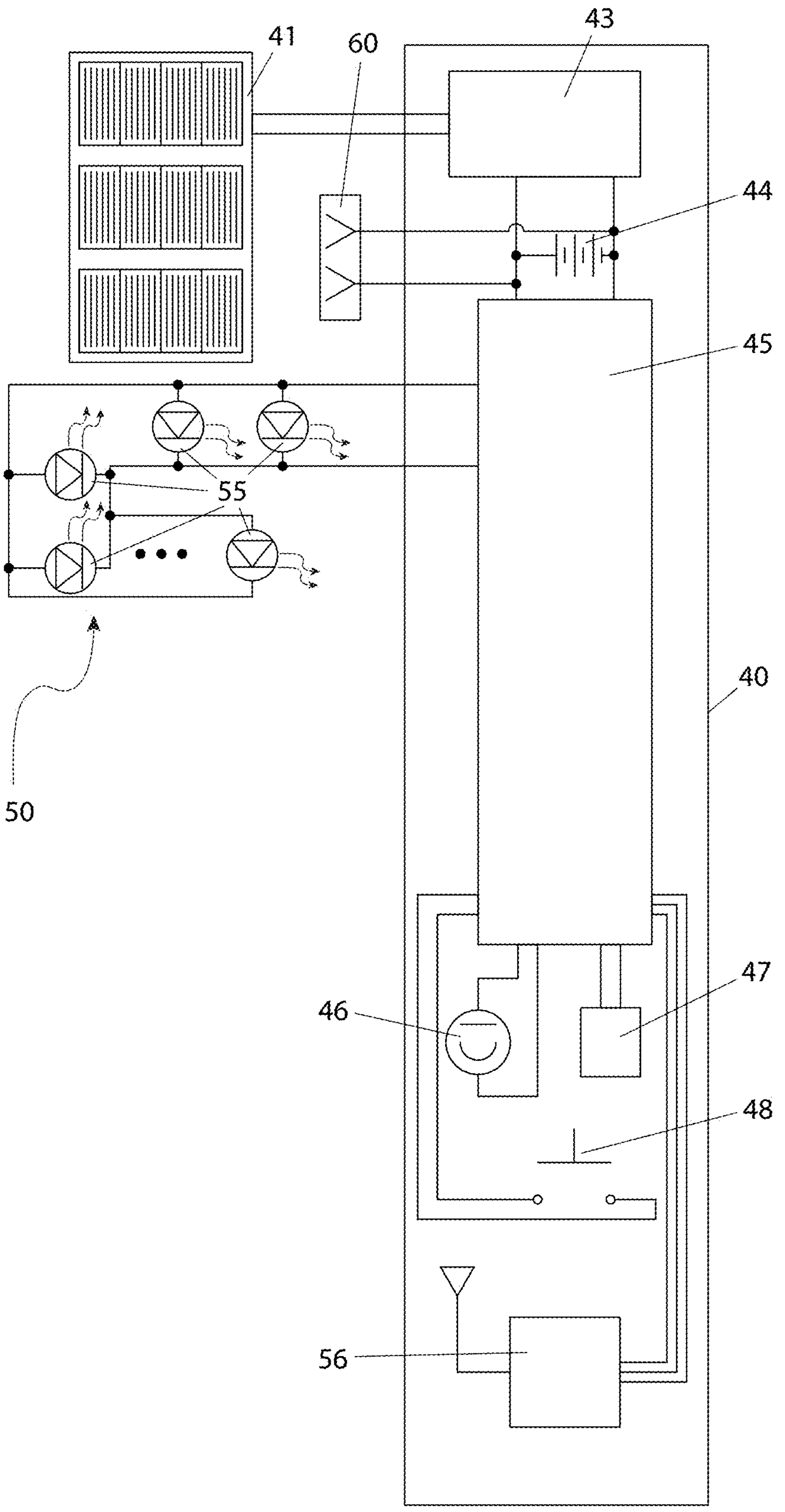

Referring now to FIG. 5, an electrical schematic of the device 10, it can be seen that power for the system 10 is generated by the photovoltaic panel 41 in a customary manner. Resultant power is then routed to a charge controller 43 which charges a rechargeable battery 44. Power from the rechargeable battery 44 is then routed to a main controller 45, envisioned to be a single board computer (SBC) such as an Arduino®, Basic Stamp Module, or the like. The main controller 45 receives input commands from a photocell 46 which turns the light string 50 on during periods of low light such as dusk, twilight, and dawn hours. The timer 47 may be manipulated to turn the light string 50 on and off during various time intervals to prevent continuous long-term activation as well as to conserve electrical power as provided by the photovoltaic panel 15 and/or the rechargeable battery 44. The mode switch 48 allows for different lighting patterns as provided to the light string 50, which is connected as an output to the main controller 45. The main controller 45 may also be interconnected to a radio transmitter 46 such as a Wi-Fi module, a Bluetooth® module, a dedicated radio system, or the like. Such an interconnection allows for remote wireless control of the light string 50 by such devices as a smart phone, tablet, dedicated computer, or similar device using a dedicated application. Such capabilities are envisioned as beneficial due to the remote location of the enclosure 60 housing the photovoltaic panel 41, charge controller 43, rechargeable battery 44, main controller 45, the photocell 46, the timer 47, the mode switch 48, and associated electronic components usually located at an elevated location. A loop power connector 60 allows for connection of power and control to other light strings 50 contained within other soffit vent covers 10 without the need for a separate enclosure 60 and associated electronics. Such a feature allows for all soffit vent covers 10 to be synchronized with respect to light control, patterns and colors.

2. Operation of the Preferred Embodiment

In operation, In operation, the illuminating soffit vent cover 10 functions in a dual capacity, simultaneously providing ventilation for the attic or roof space while delivering aesthetic illumination to enhance the building's exterior appearance. During installation, the soffit vent cover 10 is positioned with the screen 16 facing inward toward the attic space and the vent panel 26 facing outward. The light string 50 is secured within the perimeter channel 30, with the individual lamps 55 partially exposed to enable visibility from the exterior. The photovoltaic panel 41, housed within the enclosure 40, is strategically positioned to maximize solar radiation exposure, typically on an exterior surface with optimal sunlight incidence.

During daylight hours, the photovoltaic panel 41 generates electrical power which is regulated by the charge controller 43 and stored in the rechargeable battery 44. When ambient light levels decrease below a predetermined threshold, as detected by the photocell 46, the main controller 45 activates the light string 50 according to programmed parameters. The user may pre-configure operational settings via the timer 47 to establish activation periods (e.g., dusk to dawn, specific evening hours) and via the mode switch 48 to select illumination patterns (e.g., steady illumination, sequential patterns, color variations for multi-colored LEDs). Additionally, remote adjustment capabilities are provided through the radio transmitter 56, enabling configuration modifications via wireless devices without requiring physical access to the installation location. For installations comprising multiple soffit vent covers 10, the loop power connector 60 facilitates synchronized operation, ensuring uniform illumination patterns and timing across all installed units. During periods of extended insufficient solar radiation, the rechargeable battery 44 provides operational power reserves to maintain programmed illumination schedules, with the main controller 45 potentially implementing power conservation protocols to extend operational duration.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

The invention claimed is:

1. An illuminating soffit vent cover configured for installation on an underside of a roof eave of a building structure to provide ventilation from an interior thereof while simultaneously providing decorative perimeter illumination visible from ground level comprising:

a four-sided frame assembly having an inner side and an outer side, each side having front, rear, first side, and second side frame elements defining an open middle;

a screen attached to said inner side covering said open middle, said screen configured to prevent debris from entering an attic or roof space while permitting airflow thereto, wherein said screen is oriented to face an attic space when installed;

a vent panel having a plurality of apertures attached to said outer side covering said open middle;

a continuous perimeter channel formed along side surfaces of said frame assembly, said perimeter channel positioned midway between said inner side and said outer side, wherein said perimeter channel is configured for frictionally retaining said light string for decorative illumination purposes and is not configured for thermal ventilation; and a light string comprising a plurality of lamps positioned within said perimeter channel, wherein said light string is configured to be visible from an exterior of the building structure when said soffit vent cover is installed.

2. The illuminating soffit vent cover of claim 1, further comprising a solar power system for providing electrical power to said light string, wherein said solar power system comprises a photovoltaic panel housed within an enclosure configured to be mounted adjacent to the building structure where said soffit vent cover is installed.

3. The illuminating soffit vent cover of claim 2, wherein said solar power system comprises:

a photovoltaic panel;

a charge controller connected to said photovoltaic panel;

a rechargeable battery connected to said charge controller; and a main controller connected to said rechargeable battery and said light string.

4. The illuminating soffit vent cover of claim 3, wherein said solar power system further comprises:

a photocell connected to said main controller for automatically activating said light string during low-light conditions;

a timer connected to said main controller for scheduling activation and deactivation of said light string; and a mode switch connected to said main controller for selecting different lighting patterns for said light string.

5. The illuminating soffit vent cover of claim 3, wherein said solar power system further comprises a radio transmitter connected to said main controller for enabling remote wireless control of said light string.

6. The illuminating soffit vent cover of claim 1, wherein said frame elements of said inner side and said outer side are bevel cut on opposing terminal ends.

7. The illuminating soffit vent cover of claim 1, wherein said frame elements have a sloped outer surface with a thicker outer perimeter relative to an inner perimeter.

8. The illuminating soffit vent cover of claim 1, wherein said light string comprises light-emitting diodes (LEDs).

9. The illuminating soffit vent cover of claim 1, wherein said perimeter channel has a depth and width of approximately one-quarter of an inch, said depth and width sized to permit a snug frictional fit of said light string therein while permitting said plurality of lamps to be at least partially exposed for adequate illumination.

10. The illuminating soffit vent cover of claim 1, further comprising a pair of frame channels situated in a midpoint of said rear frame element inner side, transversely oriented relative to said perimeter channel, said frame channels extending from said perimeter channel to said open middle, said frame channels configured to route said light string from an exterior power source to said perimeter channel.

11. The illuminating soffit vent cover of claim 1, wherein said light string comprises:

a first connector at a first terminal end configured to connect to a power source comprising a photovoltaic panel via a first coupler; and a second connector at a second terminal end configured to connect to another light string of another soffit vent cover via a second coupler.

12. The illuminating soffit vent cover of claim 1, wherein said frame assembly has dimensions selected from the group consisting of six by eighteen inches (6×18 in.), eight by eighteen inches (8×18 in.), and ten by eighteen inches (10×18 in.).

13. The illuminating soffit vent cover of claim 1, wherein said frame assembly is fabricated from a material selected from the group consisting of wood and plastic with a faux wood finish.

14. The illuminating soffit vent cover of claim 1, wherein said vent panel and said screen are fabricated from a material selected from the group consisting of sheet steel and aluminum that is weatherproof, durable and inert.

15. A system for illuminating soffit vents of a building structure comprising:

a plurality of illuminating soffit vent covers, each soffit vent cover configured for installation on a soffit portion of the building structure and comprising:

a four-sided frame assembly having an inner side facing toward an attic space and an outer side exposed to an exterior environment:

a screen attached to said inner side for preventing debris entry while permitting airflow;

a vent panel with apertures attached to said outer side;

a continuous perimeter channel formed along side surfaces of said frame assembly; and a light string comprising a plurality of lamps positioned within said perimeter channel; and a loop power connector configured to connect said plurality of illuminating soffit vent covers for synchronized operation, wherein said loop power connector enables all soffit vent covers to be synchronized with respect to light control, patterns, and colors without requiring a separate enclosure and associated electronics for each soffit vent cover.

* * * * *